United States Patent [19]

Jaeger

[11] Patent Number: 4,625,075
[45] Date of Patent: Nov. 25, 1986

[54] PATTERNED CONDUCTIVE INK TOUCH PANEL

[75] Inventor: Robert P. Jaeger, Moorpark, Calif.

[73] Assignee: Sierracin Corporation, Sylmar, Calif.

[21] Appl. No.: 654,374

[22] Filed: Sep. 25, 1984

[51] Int. Cl.$^4$ ............................................. G08C 21/00
[52] U.S. Cl. ...................................................... 178/18
[58] Field of Search .............................. 178/18, 19, 20;
340/365 R, 365 A, 365 B, 365 L, 365 C, 812, 710, 712

[56] References Cited

U.S. PATENT DOCUMENTS

| | | | |
|---|---|---|---|
| 2,000,446 | 8/1959 | McLaughlin | 178/18 |
| 3,304,612 | 2/1967 | Proctor et al. | 33/1 |
| 3,522,664 | 8/1970 | Lambright et al. | 35/8 |
| 3,591,718 | 7/1971 | Asano | 178/19 |
| 3,699,439 | 10/1972 | Turner | 324/71 R |
| 3,798,370 | 3/1974 | Hurst | 178/18 |
| 3,806,912 | 4/1974 | Ecmert | 340/347 R |
| 3,894,183 | 7/1975 | Barish | 178/18 |
| 3,914,548 | 10/1975 | Barish | 178/18 |
| 4,079,194 | 3/1978 | Kley | 178/18 |
| 4,160,241 | 7/1979 | Shimizu et al. | 340/763 |
| 4,214,122 | 7/1980 | Kley | 178/18 |
| 4,371,746 | 2/1983 | Pepper | 178/18 |
| 4,386,232 | 3/1983 | Slater | 178/18 |

OTHER PUBLICATIONS

Sierracin/Intrex Products brochure entitled "Touch the Future Thru Transflex".
Sierracin/Transflex Products–"Specification for Flat/-Curved Transflex Switch Overlays".
Sierracin/Transflex Products–"Specification for Formed Transflex Switch Overlays".

Primary Examiner—Stafford D. Schreyer
Attorney, Agent, or Firm—Sheldon & Mak

[57] ABSTRACT

An analog touch panel comprising two flexible elements, each comprising a flexible membrane coated with a thin layer of conductive material. The elements are oriented so that the conductive coatings are facing each other when the touch panel is assembled. A network of diametrically opposite segmented busbars is formed on the conductive surface of each membrane by screening a conductive ink thereon. Patterned conductive trace members electrically couple the busbars to a conductive trunk, the tail end of which terminates at a connector device. The traces are patterned in a manner such that compensation is provided for positionally caused differences in resistance which otherwise would occur due to the use of conductive inks.

20 Claims, 5 Drawing Figures

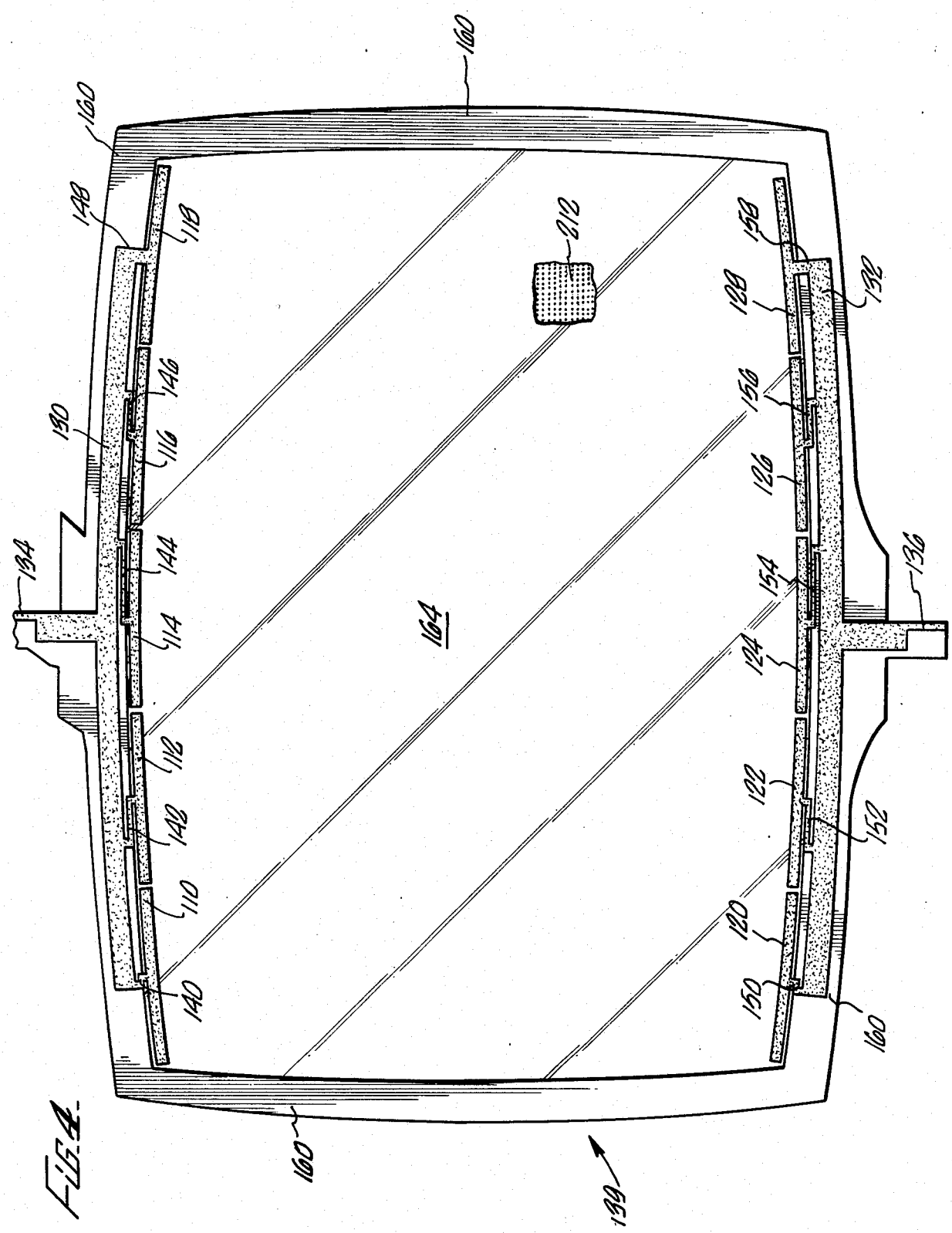

PATTERNED CONDUCTIVE INK TOUCH PANEL

BACKGROUND

The present invention relates to touch panels assembled from two flexible substrates each having electrically conductive traces formed by screening a conductive ink onto the conductive surfaces of the substrate.

Touch panels are described in U.S. Pat. Nos. 3,522,664; 3,591,718; 3,699,439; 3,894,183; 3,914,548; and 4,079,194 to Kley. These panels generally comprise two flexible planar membrane elements, each element being formed from a flexible plastic film coated with a thin layer of conductive material. The plastic film can be polyester film and the conductive material can be gold. The membrane elements are oriented such that the conductive coatings face each other. Operation of the touch panel is initiated by a user forcing the conductive surfaces of the elements into point contact. By alternately driving each element from a power source through a network of opposed busbars, signals are generated which represent the X and Y positions of the touch point.

A difficulty with such touch panels is non-linearity in the output of the device due to the non-uniform distribution of an electric field across the resistance, i.e., the output from a non-linear device is not directly proportional to the distance from the point activated to the busbars. For example, the outputs from two points, where one point is located twice as far from one of the busbars as the other point, do not exhibit a 2:1 response as would a linear device.

In an attempt to alleviate this problem, Kley teaches including high resistance bands parallel to the edges of the grid area to reduce shunting at the edges of the grid area.

A difficulty with the Kley device is the extra expense and labor required in producing the high resistance areas. Further, the effectiveness of the Kley device for accurately detecting changes in resistance when the touch panel is activated is questionable; there is concern that the high resistance bands will mask small variations in output resulting from small changes in the locus of the activated points. In other words, the resistance added by the high resistance bands will be so great, that the minor changes resulting from changes in where the touch panel is touched will be too small to reliably detect.

In view of these problems, there is a need for a technique to effectively and reliably linearize the output from a touch panel, without increasing the cost and difficulty in manufacturing the device.

SUMMARY

The present invention provides an improved touch panel wherein the aforementioned disadvantages are eliminated. In particular, segmented busbars are formed on the conductive layers of each flexible membrane element by a screening process utilizing an electrically conductive ink. The screening of conductive ink is a uniform, consistent, and accurate process. The conductive ink is laid directly onto the conductive film ensuring good electrical connection (no separation) between the busbar and film even during flexing. The screening process also enables the termination of the busbar to an external connector via a uniformly electrically conductive trunk. Linearization is provided by connecting the busbar segments to the trunk with connecting members (traces) of varying resistivity such that the total resistance of the conductive path between any panel touch point at the same distance from the segmented busbars and the termination point of the trunk is substantially the same.

BRIEF DESCRIPTION OF THE DRAWINGS

For a better understanding of the invention as well as other objects and further features thereof, reference is made to the following description which is to be read in conjunction with the accompanying drawings wherein:

FIG. 4 is a plan view of one completed flexible membrane element for use in forming a touch panel according to the present invention.

DESCRIPTION

Figure 1:
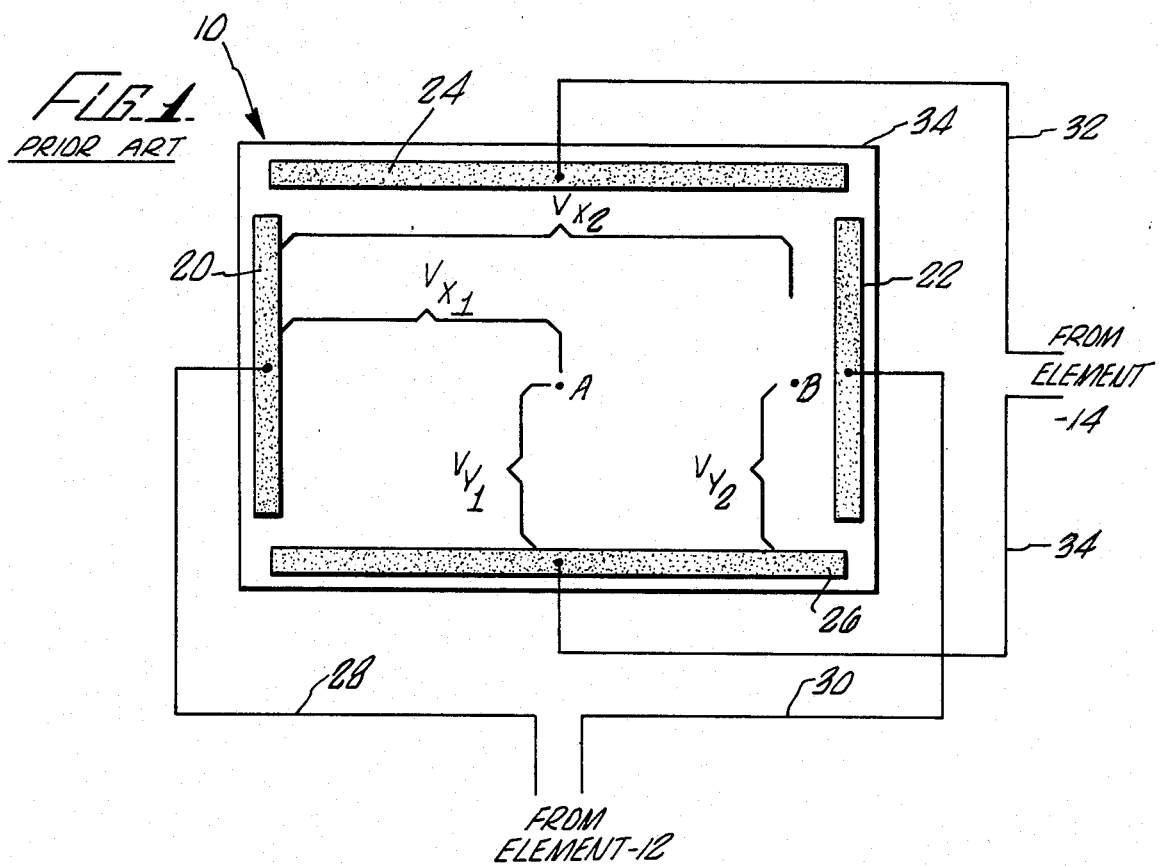
FIG. 1 illustrates a top plan view in simplified form of a prior art touch panel.
Figure 1A:
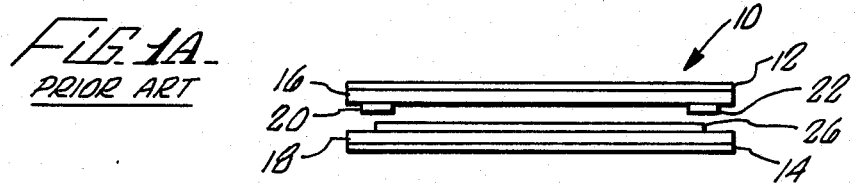
FIG. 1A is a front elevation view of the prior art panel shown in FIG. 1.

In order to put the present invention in proper perspective, a brief discussion of a prior art analog touch panel will initially be set forth. Referring to FIGS. 1 and 1A, a simplified view of such a touch panel 10 is illustrated. The touch panel 10 comprises two flexible, planar membrane elements 12 and 14 having conductive films 16 and 18, respectively. Typically each element comprises transparent polyester film with the conductive film comprising a layer of gold or indium tin oxide. Transparent elements are used when the panel is placed on an optical display device such as a CRT. Alternatively, non-transparent, i.e. opaque, elements can be used. The elements 12 and 14 are oriented so that the conductive coatings 16 and 18 face one another. A set of parallel busbars 20 and 22 are formed on coating 16 and a set of parallel busbars 24 and 26 are formed on coating 18. Both elements 12 and 14 of the panel are shown in a simplified view, assembled. The busbars can comprise copper strips formed from copper foil or tape, the strips being affixed by conductive glue to the underlying conductive layer. Alternatively, as described in the aforementioned U.S. Pat. No. 4,079,194, the busbars can be formed of a conductive ink.

Panel 10 is inoperative until pressure is applied to a point on the non-conductive surface of element 12 or 14, the panel being closed at the corresponding contact point of coatings 16 and 18.

The details of how the location of points A and B are determined is not set forth herein since these techniques are conventional, as shown for example in U.S. Pat. No. 3,522,665. Suffice it to say that by alternately driving each element through the network of diametrically opposed busbars 20, 22 and 24, 26, the resultant vertical (Y) and horizontal (X) position signals can be determined by measuring the voltage drops Vx and Vy and scaling the signals. The voltage drops are measured from the signals on leads or trunks 28 and 30 from busbars 20 and 22, respectively, and from leads or trunks 32 and 34 from busbars 24 and 26, respectively.

Since voltage and resistance are directly related, alternatively resistances ($R_x$ and $R_y$) can be measured. In any event, the ability to accurately determine the location of point A or B is largely dependent on the accuracy of the measurement of $V_x$ and $V_y$ (or $R_x$ and $R_y$). For simplicity, the remainder of the discussion will refer to resistances.

Figure 2:
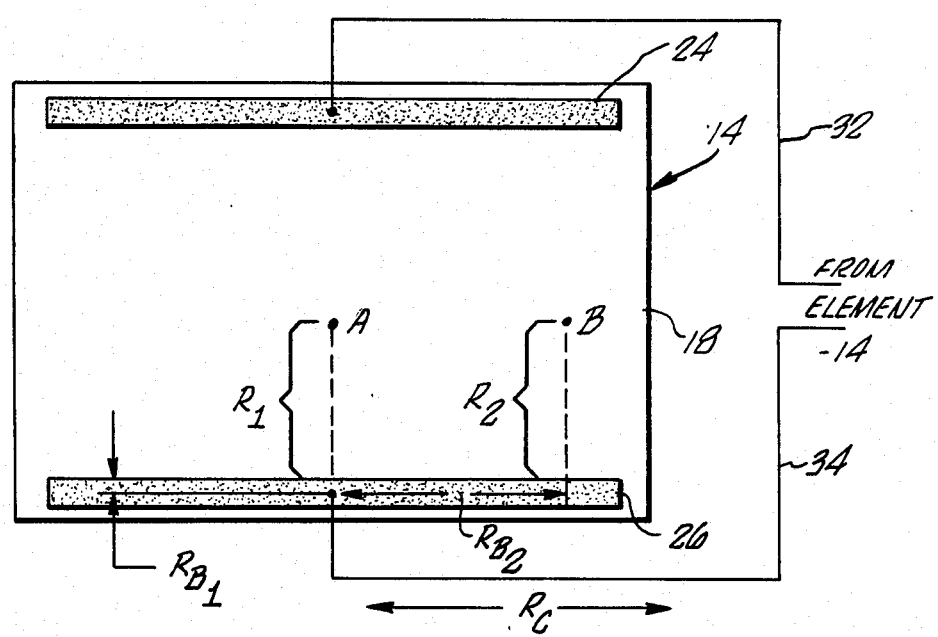
FIG. 2 schematically illustrates one element of a prior art touch panel.

Referring to FIG. 2, which for purposes of simplicity only shows one element of the touch panel 10, points A and B have the same Y coordinates, and if the panel is to exhibit linear behavior, the following must be true:

$$R_A = R_B,$$

Since
$$R_A = R_1 + R_{B1} + R_C$$

and
$$R_B = R_2 + R_{B2} + R_C,$$

Therefore
$$R_B - R_A = (R_2 - R_1) + (R_{B2} - R_{B1}) = 0$$

wherein $R_1$ = film resistance from point A to busbar 26,
$R_2$ = film resistance from point B to busbar 26,
$R_A$ = cumulative resistance from point A to interpretive circuitry,
$R_B$ = cumulative resistance from Point B to interpretive circuitry,
$R_{B1}$ = busbar resistance from edge of busbar 26 directly below point A to wire, or conductor termination,
$R_{B2}$ = busbar resistance from edge of busbar directly below point B to wire, or conductor termination, and
$R_C$ = resistance of interconnect system between busbar and interpretive circuitry.

Since $R_2 = R_1$, if the element is to be linear: $R_{B2}$ must equal $R_{B1}$.

This is not the case since it can be seen that $R_{B2}$ is different than $R_{B1}$. If the busbar material is a good conductor (such as solid copper) the difference between $R_{B2}$ and $R_{B1}$ is negligible. The above analysis indicates that the prior art touch panels using copper busbars do provide the necessary compensation for positionally caused differences in resistance.

However, using copper strips for the busbars has disadvantages associated therewith primarily due to the labor intensive nature of mounting the copper busbars in position and disengagement of the copper from the polyester membrane and conductive coating.

These above disadvantages have lead to a search for a new touch panel to obviate the noted disadvantages and in particular, a more efficient way of forming the touch panel busbars. It was initially decided to silkscreen a conductive ink on the conductive coating of the element substrate in place of copper foil. In the silkscreen process, artwork is utilized to generate a desired busbar pattern and then transferred to a silkscreen photolithographically in the conventional manner. The silkscreen allows the conductive ink material to pass through the screen to the desired areas on the underlying substrate. A conductive ink comprising conductive flakes dispersed in a thermoplastic resin and suspended in a screenable solution is selected for the silk screening process. A suitable ink comprises finely divided silver particles in a thermoplastic binder, the cured ink having a sheet resistance of less than 0.075 ohms per square at 1 mil. A suitable ink is Electrodag 427SS, available from Acheson Colloids Company, Port Huron, Mich. This ink is typically cured for 30 minutes at 150° F. although the curing temperature can vary depending upon the substrate and drying temperature. Since conductive inks are more resistive than a solid conductor, such as copper, it was determined that point B appears further away from busbar 26 than point A when using conductive inks to replace corresponding copper busbars 24 and 26 (i.e. $R_{B2}$ was significantly larger than $R_{B1}$).

Figure 3:
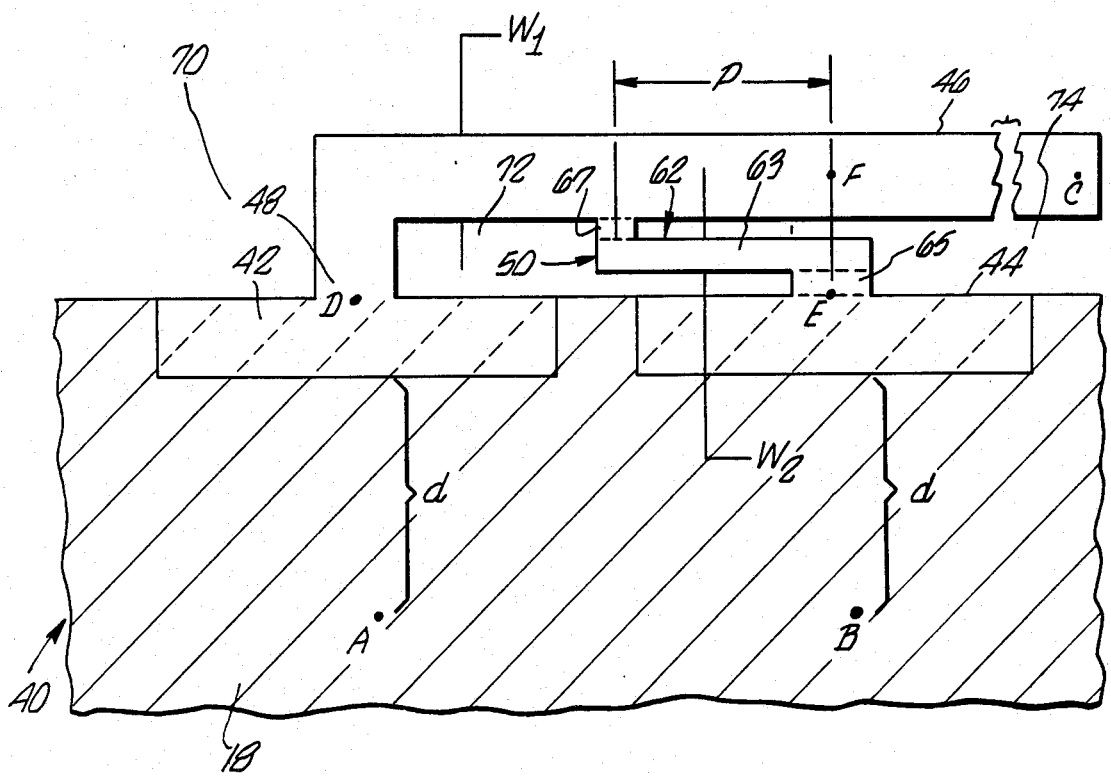
FIG. 3 illustrates a portion of one element of a touch panel utilizing a screenable conductive ink to form segmented busbars and patterned trace conductors to connect the busbar to the main trunk electrode in accordance with the teachings of the present invention.

FIG. 3 illustrates a solution to this problem according to the present invention. A planar element 40 for forming a touch panel comprises polyester film coated with a conductive coating 18 of gold. The busbars are formed with a conductive ink, the top busbar being segmented into two segments 42 and 44. A trunk 46 is also formed with the conductive ink. Top or trace portions 48 and 50 of the busbar segments 42 and 44, respectively, are also formed by the screening process to connect the busbar segments 42 and 44 to the trunk 46.

The conductive ink trace 50 in FIG. 3 for busbar segment 44 is modified by extending a tap-off 62 toward the corresponding busbar segment 42 and narrowing the tap-off 62 so as to alter its resistance to electrically simulate the condition that exists at busbar segment 42. Thus, the resistance from points A to C via tap-off 48 is substantially equal to the resistance from point B to C via tap-off 62. The tap-off 62 includes a long portion 63 and two short portions 65 and 67 transverse to the long portion 63. Horizontally extending portion 63 is interposed between the busbar segment 44 and the trunk 64 and is substantially parallel to each. The calculation for determining the compensatory distance from the normal tap-off point is as follows:

$R_{DC}$ = effective resistance from D to C
$R_{EC}$ = effective resistance from E to C
K = ink resistance rating (usually in ohms/square)
$R_{DC} = K \times$ Distance $DC/W_1$
  ($W_1$ = width of main trunk 64)
$R_{EC} = K \times$ (Distance $FC/W_1 + P/W_1 + P/W_2$)
  ($W_2$ = width of patterned trace)
$R_{DC}$ must equal $R_{EC}$ Therefore:
$$K \times DC/W_1 = K \times (FC/W_1 + P/W_1 + P/W_2)$$

$$P = [DC - FC] \times W_2/(W_2 + W_1)$$

DC, FC & $W_1$ are known

Arbitrarily choosing an appropriate value for $W_2$ enables a suitable value for P to be established, thus enabling EC and DC to be electrical matches. Alternatively, P can be arbitrarily selected and a suitable value for $W_1$ established. In essence, the length P and width $W_2$ of the trace, or tap-off conductive portion, are selected to equalize the resistance between points AC and points BC.

It should be noted that although FIG. 3 shows only two busbar segments, the same procedure can be utilized to calculate the length and width $W_2$ of traces for additional segments, i.e. there can be more than two busbar segments.

The above calculation is only for the rectangular shaped, horizontally extending portion 63 of the tap-off 62. It is assumed that the resistance of the vertically extending portions 65 and 67 does not affect the overall calculation. After actual measurements are made, the shape of the pattern can be changed to provide the required assistance if this assumption or any of the calculations is incorrect.

Areas 70, 72 and 74 are to be free of the conductive coating 18 or alternatively can be isolated from the conductive coating 18 via a deposited dielectric or other insulator, the deposition of the dielectric or other insulator being accomplished in a conventional manner. The dielectric can be polyester, which can be applied dissolved in a solvent such as butyl cellosolve acetate.

Generally the flexible film can be from about 5 to about 7 mils (0.005 to 0.007 inch) thick.

It is noted that FIG. 3 shows a partial busbar pattern on one edge of one panel element. The same patterning-/segmenting procedure can be utilized for the three remaining edges of a touch panel.

The present invention can also be used with non-rectangular touch panels. Further, the touch panel can be planar or curved to fit over a curved CRT screen.

FIG. 4 illustrates one complete element 139 of a touch panel according to the present invention, the conductive coating 164 being visible. The conductive coating 164 is on a polyester film about 7 mils thick. The conductive coating 164 has a plurality of electrically non-conductive separator dots 212 thereon on 0.1 inch centers to separate the element 139 from the conductive coating of a complementary touch panel element.

The element 139 has diametrically opposed busbar segments 110, 112, 114, 116, 118 and 120, 122, 124, 126 and 128, with trunk conductive portions 130 and 132, respectively. The trunks 130 and 132 have termination points 134 and 136, respectively. The busbar segments 110, 112 . . . 128 include trace or tap-off conductive segments 140, 142, . . . 158, respectively. A dielectric or insulating substrate 160 is provided along the outside edges of the busbars. If the conductive ink utilized introduces significantly higher undesirable resistance, an overplating of the conductive ink with a less resistive material or an alternate conductive ink can be used to lessen any undesirable effects of the higher resistance.

As can be seen clearly in FIG. 4, the tap-off conductive segments extend in a direction dependent upon the location of the corresponding busbar segment with respect to the trunk tail portion. Thus, for example, tap-off segments 140 and 142 extend to the left of busbar segments 110 and 112, respectively, for an increased resistance effect. In a similar manner, tap-off segments 146 extend to the right of busbar segment 116 to increase the resistance between the segments and termination point 134. Regarding the centrally located segment 114, the tap-off conductive segment 144 is shown as extending to the right (the terms "right" and "left" are used when viewing the element shown in FIG. 4 in the extended, or horizontal, direction) in the direction of connecting segment 148. Segment 148 and corresponding segment 158 are connected to trunk 130 directly without any tap-off conductive segment. The factor that determines which direction each of the tap-offs extends is the resistance required to make the resistance between each busbar segment and the termination point equal. The closer a busbar segment is to the tail portion, the more it is necessary to increase the resistance and thus the tap-off typically extends away from the tail portion. As can be seen from FIG. 4 of the total segments included along one edge, one of the end segments on each edge does not have a corresponding patterned tap-off conductive segment. Typically the resistivity of the conductive layer is about 11 ohms/square while the resistivity of the conductive ink is about 0.03 ohm/-square.

The element 139 shown in FIG. 4 provides the vertical position of a touch point; a corresponding element (not shown) provides the horizontal position of the touch point. Two such elements 139 assembled together provide a touch panel having visible light transmission of about 50%. Assembly of the two elements is brought about through the use of a perimeter adhesive/insulator. The details of the driving power/sensing devices necessary to produce and sense the actual signals from the touch panel are conventional and are not set forth herein. The conductive ink screening process simultaneously forms the busbar segments, the connecting segments, the trunk and termination end point on each membrane. If desired, the output from the touch panel can be converted to digital output.

The present invention thus provides a touch panel that improves upon prior art non-conductive ink panels in that the panel is more reliable, less prone to failure, and less expensive. The screening of conductive ink to form the segmented busbars and the other conductive elements is a consistent, accurate and non-labor intensive procedure. The conductive ink is deposited directly onto the conductive film ensuring a good electrical connection, even with flexing of the touch panel. The conductive ink process allows the termination of the tail portion of the trunk to a connector to be accomplished in a uniform, non-complex manner. Further, the output of the touch panel is linear.

While the invention has been described with reference to its preferred embodiments, it will be understood by those skilled in the art that various changes can be made and equivalents can be substituted for elements without departing from the true spirit and scope of the invention. In addition, many modifications may be made to adapt a particular situation or material to the teachings of the invention without departing from its essential teachings.

What is claimed is:

1. An element for use in a touch panel which generates signals representing the input positions applied thereto, the element comprising:
   (a) a flexible planar or curved member having a layer of conductive material coated on one surface thereof;
   (b) a first array of conductive segments formed along an edge of the flexible planar or curved member and in contact with the conductive material;
   (c) a conductive member comprising a first portion which is adjacent to the array of conductive segments and a second portion which includes a terminating end portion, the terminating end portion allowing connection of the touch panel to external means; and
   (d) separate connecting conductive members for connecting certain of the conductive segments of the first array to the first portion of the conductive member, the connecting members being patterned such that the total resistance from each connected segment to the terminating end portion is substantially the same, the resistance of at least two of the connecting conductive members being different.

2. The element of claim 1 wherein all but one of the segments are connected to the first portion of the conductive member by a patterned tap-off conductive segment.

3. The element of claim 1 wherein the first portion of the conductive member is substantially parallel to the array of conductive segments.

4. The element of claim 1 wherein the conductive segments comprise conductive ink.

5. The element of claim 1 wherein the first portion of the conductive member and the separate connecting conductive members comprise conductive ink formed on an insulating member.

6. An element for use in a touch panel which generates signals representing the input positions applied thereto, the element comprising:
   (a) a flexible planar or curved member having a layer of conductive material coated on one surface thereof;
   (b) a first array of conductive segments formed along an edge of the flexible planar of curved member and in contact with the conductive material;
   (c) a conductive member comprising a first portion which is adjacent to the array of conductive segments and a second portion which includes a terminating end portion, the terminating end portion allowing connection of the touch panel to external means; and
   (d) separate conductive members for connecting certain of the conductive segments of the first array to the first portion of the conductive member, the connecting members being patterned such that the total resistance from each connected segment to the terminating end portion is substantially the same, the resistance of at least two of the connecting conductive members being different; wherein the first portion of the conductive member and the separate connecting conductive members comprise conductive ink formed on an insulating member; and wherein the connecting conductive members are formed to a predetermined shape such that the total resistance from each conductive segment to the terminating end portion is substantially the same.

7. The element of claim 6 wherein the connecting conductive members comprise a substantially rectangularly shaped portion of a predetermined length and width interposed between and substantially parallel to the segmented members and the first portion of the respective conductive members, the resistance of the rectangularly shaped portion providing a substantial portion of the resistance required to enable the total resistance from the segment to the terminating end portion to be substantially the same.

8. The element of claim 7 wherein a second array of segmented conductive members are formed along the edge of the flexible member opposite the first array of the segmented conductive members, and including an arrangement of separate connecting conductive members and adjacent conductive members being provided in a manner similar to that provided for the first array.

9. A touch panel for generating signals representing input positions applied to the panel comprising:
   (a) a first flexible planar or curved member having opposed vertical edges and a layer of conductive material coated on one surface thereof;
   (b) a second flexible planar or curved member having opposed horizontal edges and a layer of conductive material coated on one surface thereof, the two layers of conductive material facing each other;
   (c) first and second arrays of conductive segments formed along the vertical edges of the first flexible member and in contact with the conductive material;
   (d) third and fourth arrays of conductive segments formed along the horizontal edges of the second flexible member and in contact with the conductive material;
   (e) first, second, third and fourth conductive members, a first portion of each conductive member being positioned adjacent the first, second, third and fourth arrays, respectively, a second portion of each conductive members including a terminating end portion for connection to means external of the touch panel; and
   (f) a plurality of patterned conductive members for connecting certain of the conductive segments to the adjacent conductive member portion of the corresponding first, second, third and fourth conductive members, the connecting members being patterned such that the total resistance from each conductive segment to the terminating end portion of the corresponding conductive member is substantially the same, the resistivity of at least two of the patterned conductive members for each segment being different.

10. The touch panel of claim 9 wherein the conductive segments comprise a conductive ink.

11. The touch panel of claim 9 wherein the first, second, third and fourth conductive members and the connecting members comprise a conductive ink and are formed on an insulating member.

12. The touch panel of claim 9 wherein the panel enables generation of analog signals representing input in response to a user forcing the conductive layers into point contact.

13. The touch panel of claim 9 wherein the patterned conductive members each comprise conductive ink of a predetermined shape such that the total resistance from each connecting segment to the corresponding terminating end portion is substantially the same.

14. The touch panel of claim 9 wherein the first and second flexible members comprise a polyester material and the conductive material is selected from the group consisting of gold and indium tin oxide.

15. The touch panel of claim 10 wherein the conductive ink comprises conductive particles dispersed in a thermoplastic resin.

16. An element for use in a touch panel which generates signals representing the input positions applied thereto, the element comprising:
   (a) a flexible planar or curved member having a layer of conductive material coated on one surface thereof;
   (b) a conductive busbar element formed along an edge of the flexible planar member and in contact with the conductive material;
   (c) a conductive member comprising a first portion which is adjacent to the conductive busbar element and a second portion which includes a terminating end portion, the terminating end portion allowing connection of the touch panel to external means; and
   (d) a plurality of separate connecting conductive members for connecting points on the busbar element to the first portion of the conductive member, the connecting members being patterned such that the total resistance from each point on the busbar element to the terminating end portion is substantially the same, the resistance of at least two of the connecting conductive members being different.

17. The element of claim 16 wherein the busbar element comprises a plurality of segments, wherein the connecting conductive members connect all but one of the segments to the first portion of the conductive member, and wherein the segments comprise conductive ink.

18. The element of claim 16 wherein the first portion of the conductive member and the separate connective conductive members comprise conductive ink formed on an insulating member.

19. The element of claim 18 wherein the connecting conductive members are formed to a predetermined shape such that the total resistance from each point on the buabar element to the terminating end portion is substantially the same.

20. The element of claim 19 wherein the connecting conductive members comprise a substantially rectangularly shaped portion of a predetermined length and width interposed between and substantially parallel to the busbar element and the first portion of the respective conductive members, the resistance of the rectangularly shaped portion providing a substantial portion of the resistance required to enable the total resistance from each point on the busbar element to the terminating end portion to be substantially the same.

* * * * *